United States Patent
Jia et al.

(10) Patent No.: US 12,380,603 B2
(45) Date of Patent: Aug. 5, 2025

(54) EXTRINSIC CALIBRATION BETWEEN DISPLAY AND EYE-TRACKING CAMERA IN HEAD-MOUNTED DEVICES

(71) Applicant: GOOGLE LLC, Mountain View, CA (US)

(72) Inventors: Zhiheng Jia, Sunnyvale, CA (US); Chao Guo, Los Altos, CA (US); Scott Fullam, Palo Alto, CA (US); Jeffrey Neil Margolis, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 31 days.

(21) Appl. No.: 18/412,931

(22) Filed: Jan. 15, 2024

(65) Prior Publication Data

US 2024/0242381 A1    Jul. 18, 2024

Related U.S. Application Data

(60) Provisional application No. 63/479,876, filed on Jan. 13, 2023.

(51) Int. Cl.
*G06T 7/80* (2017.01)
*G02B 27/01* (2006.01)
*G06F 3/01* (2006.01)

(52) U.S. Cl.
CPC ............ *G06T 7/80* (2017.01); *G02B 27/0172* (2013.01); *G02B 27/0176* (2013.01); *G06F 3/013* (2013.01)

(58) Field of Classification Search
CPC ............ G02B 27/0093; G02B 27/0172; G02B 27/0176; G06F 3/013; G06T 7/80
See application file for complete search history.

(56) References Cited

U.S. PATENT DOCUMENTS 10,983,341 B2    4/2021 Geng et al.

OTHER PUBLICATIONS

Itoh, et al., "Interaction-Free Calibration for Optical See Through Head-Mounted Displays Based On 3D Eye Localization", IEEE Symp. on 3D User Interfaces (3DUI), 2014, pp. 75-82.
Plopski, et al., "Automated Spatial Calibration of HMD Systems With Unconstrained Eye-Cameras", 2016 IEEE International Symposium on Mixed and Augmented Reality, 2016, pp. 94-99.

*Primary Examiner* — Michael B. Pierorazio
(74) *Attorney, Agent, or Firm* — Brake Hughes Bellermann LLP

(57) ABSTRACT

Techniques include performing a calibration of the display with respect to the eye-tracking camera after usage. The calibration involves determining a current position of a reflected pixel of the display within a field of view of the eye-tracking camera and comparing that position with a calibration position, for example a position seen at the factory. The pixel may then be shifted according to the difference between the current position and the calibration position.

24 Claims, 4 Drawing Sheets

200

Calibration Position 222(1)
Current Position 212(1)

Current Position 212(2)
Calibration Position 222(2)

EXTRINSIC CALIBRATION BETWEEN DISPLAY AND EYE-TRACKING CAMERA IN HEAD-MOUNTED DEVICES

CROSS REFERENCE TO RELATED APPLICATION

This application claims the benefit of U.S. Provisional Application No. 63/479,876, filed Jan. 13, 2023, the disclosure of which is incorporated herein by reference in its entirety.

TECHNICAL FIELD

This description relates in general to head mounted wearable devices, and in particular, to calibration of position and orientation of a display with respect to a user-facing camera, e.g., an eye-tracking camera.

SUMMARY

The improvement discussed herein is directed to calibration of extrinsic quantities (e.g., position and orientation) of a display of a head-mounted device (HMD) with respect to a user-facing camera, e.g., an eye-tracking camera after factory calibration, e.g., after usage in the field. The calibration involves determining a current position of a reflected pixel of the display within a field of view of the eye-tracking camera and comparing that position with a calibration position determined at the factory. The pixel may then be shifted according to the difference between the current position and the calibration position.

In one general aspect, a method can include capturing, via an eye-tracking camera on a head-mounted display (HMD), a reflection of a pixel from a first lens of the HMD where the pixel is illuminated within a display associated with a second lens of the HMD. The method can also include determining a current position of the reflection within a field of view of the eye-tracking camera. The method can further include determining a difference between the current position of the reflection within the field of view and a calibration position within the field of view.

In another general aspect, a computer program product comprising a nontransitory storage medium, the computer program product can include code that, when executed by processing circuitry, causes the processing circuitry to perform a method. The method can include capturing, via an eye-tracking camera on a head-mounted display (HMD), a reflection of a pixel from of a first lens of the HMD where the pixel is illuminated within a display associated with a second lens of the HMD. The method can also include determining a current position of the reflection within a field of view of the eye-tracking camera. The method can further include determining a difference between the current position of the reflection within the field of view and a calibration position within the field of view.

In another general aspect, an apparatus includes memory and processing circuitry coupled to the memory. The processing circuitry can be configured to capture, via an eye-tracking camera on a head-mounted display (HMD), a reflection of a pixel from a first lens of the HMD where the pixel is illuminated within a display associated with a second lens of the HMD. The processing circuitry can also be configured to determine a current position of the reflection within a field of view of the eye-tracking camera. The processing circuitry can further be configured to determine a difference between the current position of the reflection within the field of view and a calibration position within the field of view.

The details of one or more implementations are set forth in the accompanying drawings and the description below. Other features will be apparent from the description and drawings, and from the claims.

DETAILED DESCRIPTION

Figure 1:
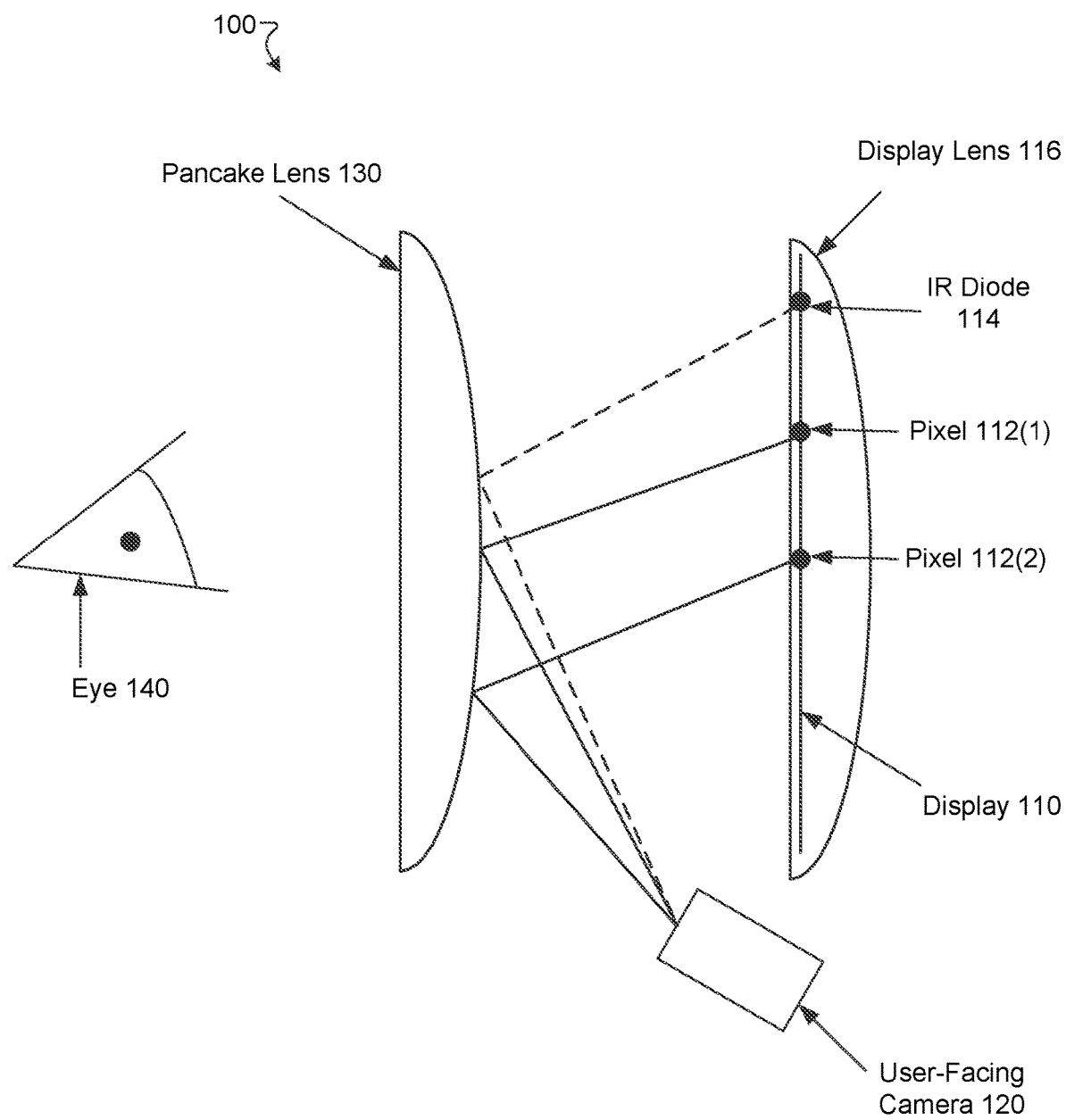
FIG. 1 is a diagram illustrating an example system, in accordance with implementations described herein.

Head-mounted displays (HMDs) for systems such as extended reality (XR) may use a user-facing camera such as an eye-tracking camera to gather data such as eye gaze direction. It is noted that other user-facing cameras can be used as well, e.g., face-tracking cameras. In some implementations that are described herein the eye-tracking camera is used an example, but some implementations can use other types of eye-tracking cameras.

The eye-tracking camera and the display can be calibrated at the factory. For example, during the manufacture process, the position of pixels of the display can be calibrated with respect to the eye-tracking camera. In some implementations, at least one way this may be done is to image the pixels within a field of view of the eye-tracking camera using an external optical system that maps rays from the display to the eye-tracking camera.

At least one technical problem with the calibration described above is that the position and orientation of the display can drift with respect to the eye-tracking camera during use. For example, the HMD may have some flexibility in the frame for the comfort of users. That flexibility, however, may cause the display to move during use. The movement of the display can, in turn, cause discomfort for the user.

At least one technical solution to the above-described technical problem includes performing a calibration of the display with respect to the eye-tracking camera after usage. The calibration involves determining a current position of a reflected pixel of the display within a field of view of the eye-tracking camera and comparing that position with a calibration position determined at the factory. The illuminated pixel may then be shifted according to the difference between the current position and the calibration position.

In some implementations, light from the illuminated pixel is reflected from (e.g., off of) a lens (e.g., pancake lens) of the HMD along a path to the eye-tracking camera. In some implementations, the lens can be disposed between an eye of a user and the display and can be configured to image pixels of the display onto the eye. In some implementations, the HMD may be configured to operate in one or more sets of modes. For example, the reflection of the light from the pixel from the lens and captured by the eye-tracking camera can be performed in a calibration mode (e.g., first mode) and the imaging of the pixels of the display onto the eye via the pancake lens can be performed in a user mode (e.g., a second mode).

In some implementations, infrared (IR) illumination is used to enhance the reflection of the pixel of the display at the eye-tracking camera. In some implementations, the source of the IR illumination includes an IR diode at an edge of the display. The IR illumination from the IR diode is reflected from the pancake lens and is received at the eye-tracking camera.

At least one technical advantage of the technical solution is that the display may remain calibrated with respect to the eye-tracking camera. Such maintenance of this calibration can ensure, in some implementations, that the user is able to remain comfortable during usage of the HMD.

FIG. 1 is a diagram illustrating an example HMD system 100. The HMD system 100 includes a display 110 within a display lens 116, a user-facing camera 120, and a pancake lens 130.

The display 110 is configured to provide images of objects to a user. The display includes numerous pixels that may or may not be illuminated depending on the image provided. The display 110 has a position and an orientation in space and also with respect to other components of the HMD system 100. The position and orientation of the display 110 with respect to other components of the HMD system 100 form the extrinsic quantities, or extrinsics, of the display 110 and the other components. For example, while an intrinsic quantity of the display 110 may include quantities such as the temperature, color distribution, and refresh rate, an extrinsic quantity of the display 110 can be, for example, a quantity such as position and orientation with respect to another component of the HMD system 100, e.g., the user-facing camera 120.

The position and/or orientation of the display 110, e.g., with respect to the eye-tracking camera 120, may change due to deformation of a frame of the HMD system 100 (not pictured). Such a change in the position and/or orientation of the display 110 can have a disorientating effect on the user and affect the comfort of the user while using the HMD system 100. Accordingly, a calibration of the position and/or orientation of the display 110 with respect to the eye-tracking camera 120 may be needed after use by the user.

As shown in FIG. 1, the display 110 includes illuminated pixels 112(1) and 112(2). The illuminated pixels 112(1) and 112(2) are examples of illuminated pixels of the display 110, and there may be a single illuminated pixel, or many illuminated pixels. It is these illuminated pixels 112(1) and 112(2) that are imaged by the eye-tracking camera 120.

The eye-tracking camera 120 is configured to form an image of an eye 140. For example, the eye-tracking camera 120 may be used to determine a gaze direction of the eye 140. Such a determination of a gaze direction of the eye 140 may in turn determine whether to illuminate certain pixels on the display 110.

In the scenario illustrated in FIG. 1, the eye-tracking camera 120 is also used to capture reflected pixels 112(1) and 112(2) of the display 110. As shown in FIG. 1, the capturing of the reflected pixels 112(1) and 112(2) of the display 110 is performed with assistance of the pancake lens 130.

The pancake lens 130 is configured to enable the eye 140 to image illuminated pixels of the display 110, e.g., illuminated pixels 112(1) and 112(2). The pancake lens 130 is also configured to enable the eye-tracking camera 120 to form an image of the eye 140. In some implementations, other types of lenses can be used instead of the pancake lens 130. For example, instead of the pancake lens 130, a Fresnel lens or a birdbath lens can be used.

In the scenario shown in FIG. 1, the pancake lens 130 is used to reflect rays from the illuminated pixels 112(1) and 112(2) to the eye-tracking camera 120. The reflected rays (shown as solid in FIG. 1) form a reflection of the pixels 112(1) and 112(2) captured in the field of view of the eye-tracking camera 120. In some implementations, the reflection capture is performed in a dark environment such as in a carrying case so that external light that would transmit through the pancake lens would not wash out the illumination reflected from the surface of the pancake lens 130.

The scenario shown in FIG. 1 involving the pancake lens 130 is not the only scenario in which the illuminated pixels 112(1) and 112(2) of the display 110 may have their reflections captured by the eye-tracking camera 120. For example, a mirror or a folding optical system could be inserted substantially parallel to the display 110 to reflect the rays from the illuminated pixels 112(1) and 112(2) to the eye-tracking camera 120.

In at least some scenarios, the eye-tracking camera 120 captures the reflected pixels 112(1) and 112(2) within a field of view of the eye-tracking camera 120. Further details of this image are discussed with regard to FIG. 2.

Figure 2:
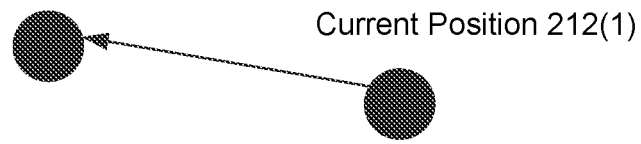
FIG. 2 is a diagram illustrating an example comparison of a current image of an illuminated pixel of a display to a previous image of the illuminated pixel of the display.
Figure 2:
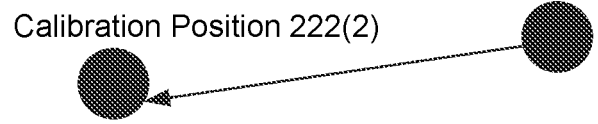

FIG. 2 is a diagram illustrating an example comparison of a current reflection of an illuminated pixel of a display within a field of view 200 of an eye-tracking camera (e.g., eye-tracking camera 120) to reflection of the pixel of the display within the field of view 200 at initial calibration in the factory.

In FIG. 2, the reflection of a first illuminated pixel (e.g., illuminated pixel 112(1)) is at a current image position 212(1) within the field of view 200 of the eye-tracking camera, and the reflection of a second illuminated pixel (e.g., illuminated pixel 112(2)) is at current position 212(2) within the field of view 200 of the eye-tracking camera.

To determine whether the position and orientation of the display (e.g., display 110) has changed during use, the current positions 212(1) and 212(2) are to be compared to calibration positions 222(1) and 222(2), respectively. For example, calibration positions 222(1) and 222(2) may correspond to positions of reflections of the illuminated pixels captured at the time of manufacture in a factory, before use.

Accordingly, the calibration positions 222(1) and 222(2) may be stored in a memory associated with processing circuitry of the HMD system (e.g., HMD system 100). When the illuminated pixels of the display are reflected, the current positions 212(1) and 212(2) within the field of view 200 are determined using, e.g., computer vision techniques. The processing circuitry then forms differences between the current positions 212(1) and 212(2) within the field of view 200 and the calibration positions 222(1) and 222(2) within the field of view 200.

The difference between the current position 212(1) and the calibration position 222(1) may then be used to determine a position of the pixel (e.g., pixel 112(1)); similarly, the difference between the current position 212(2) and the calibration position 222(2) may then be used to determine a position of the pixel (e.g., pixel 112(2)). In some implementations, the position of the pixel (e.g., pixel 112(1)) may be determined by determining a transformation between the calibration position 222(1) and the position of the pixel at the factory. The processing circuitry would then apply the transformation to the difference to determine an amount that the position of the pixel has moved from the calibration position.

Based on the determined amount that the pixel has moved (e.g., the difference), the processing circuitry may then adjust the position of the pixel as a calibration measure. That is, the processing circuitry may adjust the position of the pixel to correct for the movement of the display under, e.g., deformation of the frame.

Returning to FIG. 1, in some implementations the eye-tracking camera 120 is an infrared (IR) camera. In such an implementation, an IR illumination source, e.g., an IR diode 114 is attached to the display 110. The IR diode 114 further illuminates the reflections of the pixels 112(1) and 112(2) captured by the eye-tracking camera 120. In the implementation shown in FIG. 1, the illumination from the IR diode 114 reflects from the pancake lens 130 (dashed line).

Figure 3:
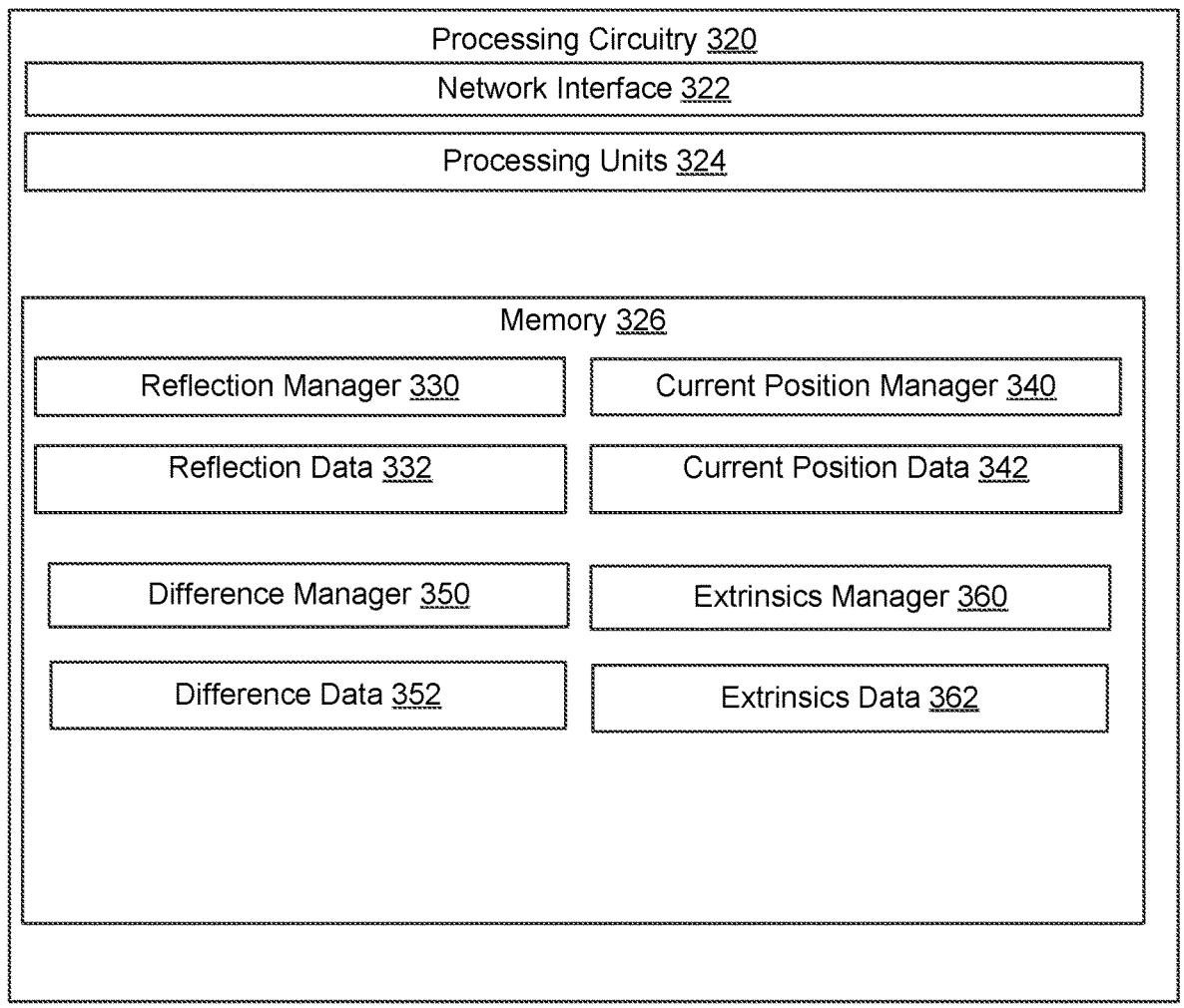
FIG. 3 is a diagram illustrating an example electronic environment for calibrating a display of a HMD to a user-facing camera of the HMD.

FIG. 3 is a diagram that illustrates example processing circuitry 320 connected to an HMD system (e.g., HMD system 100). The processing circuitry 320 is configured to capture a reflection of an illuminated pixel (e.g., pixel 112(1)) of a display (e.g., display 110) using a user-facing camera (e.g., eye-tracking camera 120) and determine a position and orientation of the illuminated pixel relative to the user-facing camera based on the reflection.

The processing circuitry 320 includes a network interface 322, one or more processing units 324, and nontransitory memory 326. The network interface 322 includes, for example, Ethernet adaptors, Bluetooth adaptors, and the like, for converting electronic and/or optical signals received from the network to electronic form for use by the processing circuitry 320. The set of processing units 324 include one or more processing chips and/or assemblies. The memory 326 is a storage medium and includes both volatile memory (e.g., RAM) and non-volatile memory, such as one or more read only memories (ROMs), disk drives, solid state drives, and the like. The set of processing units 324 and the memory 326 together form part of the processing circuitry 320, which is configured to carry out various methods and functions as described herein as a computer program product.

In some implementations, one or more of the components of the processing circuitry 320 can be, or can include processors (e.g., processing units 324) configured to process instructions stored in the memory 326. Examples of such instructions as depicted in FIG. 3 include a reflection manager 330, a current position manager 340, a difference manager 350, and an extrinsics manager 360. Further, as illustrated in FIG. 3, the memory 326 is configured to store various data, which is described with respect to the respective managers that use such data.

The reflection manager 330 is configured to via an eye-tracking camera on a head-mounted display (HMD), a reflection of a pixel from a first lens of the HMD, the pixel being illuminated within a display associated with a second lens of the HMD. The reflection data 332 may include the captured reflection of the illuminated pixel. In some implementations, the user-facing camera is an eye-tracking camera. In some implementations, the user-facing camera is a face-tracking camera. In some implementations, the reflection is captured using reflections of the illumination from the illuminated pixel from a pancake lens. In some implementations, an IR diode is used to further illuminate the reflection in the user-facing camera. In some implementations, the image manager 330 is configured to capture the reflection of the illuminated pixel in a calibration mode, e.g., when the HMD system is in a dark environment such as a carrying case.

The current position manager 340 is configured to determine a current position of the reflection within a field of view of the eye-tracking camera. In some implementations, the current position of the image within the field of view of the user-facing camera is determined using computer vision techniques.

The difference manager 350 is configured to determine a difference between the current position of the reflection within the field of view and a calibration position within the field of view. The difference data 352 includes the calibration position of the reflection of the illuminated pixel of the display within the field of view as well as the difference between the current position and the calibration position. In some implementations, the difference is a vector difference corresponding to the case in which the current position and the previous position are vectors. In some implementations, the difference is a scalar quantity.

The extrinsics manager 360 is configured to determine a position of the pixel relative to the eye-tracking camera based on the difference. In some implementations, the extrinsics manager is further configured to adjust a position of the illuminated pixel to calibrate the display based on the difference.

The components (e.g., modules, processing units 324) of processing circuitry 320 can be configured to operate based on one or more platforms (e.g., one or more similar or different platforms) that can include one or more types of hardware, software, firmware, operating systems, runtime libraries, and/or so forth. In some implementations, the components of the processing circuitry 320 can be configured to operate within a cluster of devices (e.g., a server farm). In such an implementation, the functionality and processing of the components of the processing circuitry 320 can be distributed to several devices of the cluster of devices.

The components of the processing circuitry 320 can be, or can include, any type of hardware and/or software configured to process attributes. In some implementations, one or more portions of the components shown in the components of the processing circuitry 320 in FIG. 3 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the processing circuitry 320 can be, or can include, a software module configured for execution by at least one processor (not shown). In some implementations, the functionality of the components can be included in different modules and/or different components than those shown in FIG. 3, including combining functionality illustrated as two components into a single component.

Although not shown, in some implementations, the components of the processing circuitry 320 (or portions thereof) can be configured to operate within, for example, a data center (e.g., a cloud computing environment), a computer system, one or more server/host devices, and/or so forth. In some implementations, the components of the processing circuitry 320 (or portions thereof) can be configured to operate within a network. Thus, the components of the processing circuitry 320 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the search system can be, or can include, processors configured to process instructions stored in a memory. For example, reflection manager 330 (and/or a portion thereof), current position manager 340 (and/or a portion thereof), difference manager 350 (and/or a portion thereof), and extrinsics manager 360 (and/or a portion thereof) are examples of such instructions.

In some implementations, the memory 326 can be any type of memory such as a random-access memory, a disk drive memory, flash memory, and/or so forth. In some implementations, the memory 326 can be implemented as more than one memory component (e.g., more than one RAM component or disk drive memory) associated with the components of the processing circuitry 320. In some implementations, the memory 326 can be a database memory. In some implementations, the memory 326 can be, or can include, a non-local memory. For example, the memory 326 can be, or can include, a memory shared by multiple devices (not shown). In some implementations, the memory 326 can be associated with a server device (not shown) within a network and configured to serve the components of the processing circuitry 320. As illustrated in FIG. 3, the memory 326 is configured to store various data, including image data 332 and current position data 342.

Figure 4:
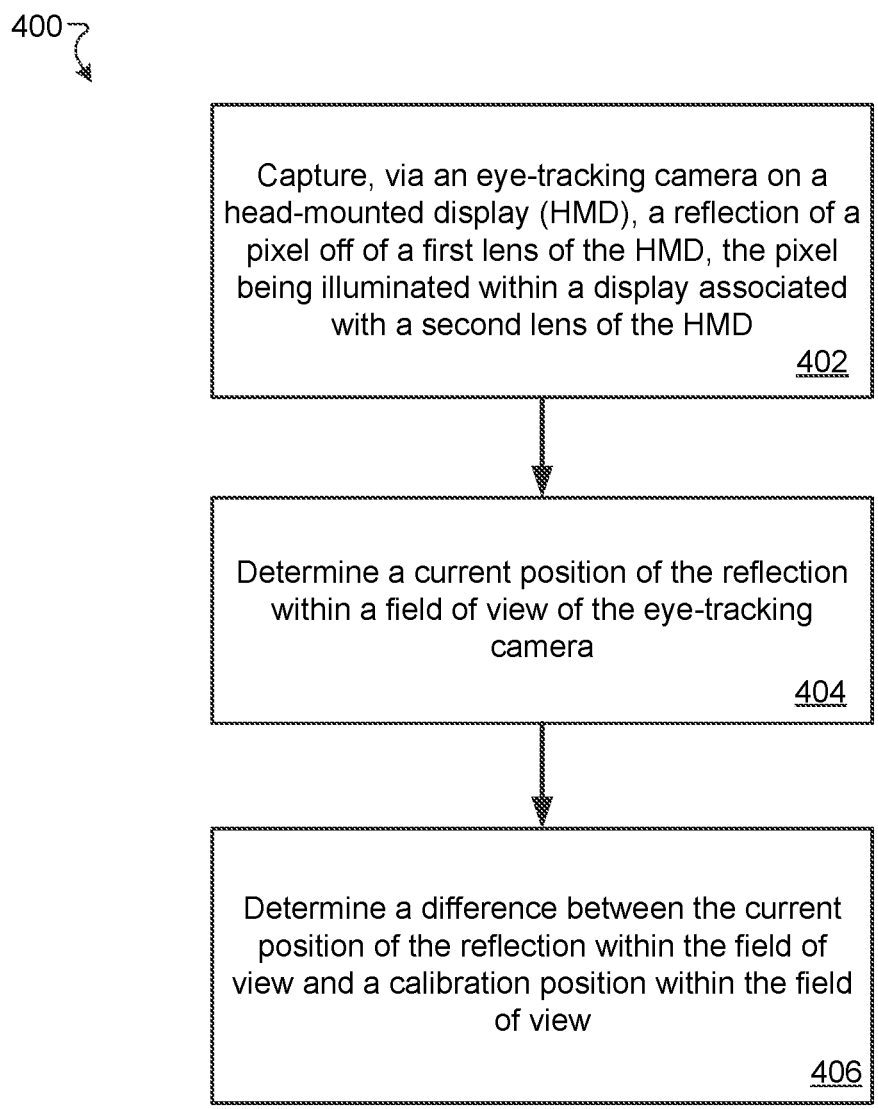
FIG. 4 is a flow chart illustrating a method of calibrating a display of a HMD to a user-facing camera of the HMD.

FIG. 4 is a flow chart illustrating a method 400 of determining a position and orientation of an illuminated pixel relative to an eye-tracking camera based on a reflection of the pixel captured by the eye-tracking camera.

At 402, a reflection manager (e.g., 330) captures, via an eye-tracking camera (e.g., eye-tracking camera 120) on a head-mounted display (HMD, e.g., HMD system 100), a reflection of a pixel (e.g., pixel 112(1)) from a first lens (e.g., pancake lens 130) of the HMD, the pixel being illuminated within a display (e.g., display 110) associated with a second lens (e.g., display lens 116) of the HMD.

At 404, a current position manager (e.g., 340) determines a current position (e.g., 212(1)) of the reflection within a field of view (e.g., 200) of the eye-tracking camera.

At 406, a difference manager (e.g., 350) determines a difference between the current position of the reflection within the field of view and a calibration position (e.g., 222(1)) within the field of view.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A method, comprising:
    capturing, via an eye-tracking camera on a head-mounted display (HMD), a reflection of a pixel from a first lens of the HMD, the pixel being illuminated within a display associated with a second lens of the HMD;
    determining a current position of the reflection within a field of view of the eye-tracking camera; and
    determining a difference between the current position of the reflection within the field of view and a calibration position within the field of view.

2. The method as in claim 1, further comprising:
    determining a position of the pixel relative to the eye-tracking camera based on the difference.

3. The method as in claim 1, further comprising:
    adjusting the position of the pixel to calibrate the display based on the difference.

4. The method as in claim 1, wherein the first lens of the HMD is a pancake lens.

5. The method as in claim 1, wherein the reflection is further illuminated with infrared (IR) illumination from an IR diode, the IR diode being attached to the display of the HMD.

6. The method as in claim 5, wherein the IR illumination further illuminates the reflection via a reflection from the first lens of the HMD.

7. The method as in claim 1, wherein the capturing of the reflection is performed in a first mode of a set of modes, the set of modes including a second mode in which the eye-tracking camera captures an image of an eye.

8. The method as in claim 7, wherein the capturing of the reflection in the first mode is performed in a dark environment.

9. A computer program product comprising a nontransitory storage medium, the computer program product including code that, when executed by processing circuitry, causes the processing circuitry to perform a method, the method comprising:
    capturing, via an eye-tracking camera on a head-mounted display (HMD), a reflection of a pixel from a first lens of the HMD, the pixel being illuminated within a display associated with a second lens of the HMD;
    determining a current position of the reflection within a field of view of the eye-tracking camera; and
    determining a difference between the current position of the reflection within the field of view and a calibration position within the field of view.

10. The computer program product as in claim 9, wherein the method further comprises:
    determining a position of the pixel relative to the eye-tracking camera based on the difference.

11. The computer program product as in claim 9, wherein the method further comprises:
    adjusting the position of the pixel to calibrate the display based on the difference.

12. The computer program product as in claim 9, wherein the first lens of the HMD is a pancake lens.

13. The computer program product as in claim 9, wherein the reflection is further illuminated with infrared (IR) illumination from an IR diode, the IR diode being attached to the display of the HMD.

14. The computer program product as in claim 13, wherein the IR illumination further illuminates the reflection via a reflection from the first lens of the HMD.

15. The computer program product as in claim 9, wherein the capturing of the reflection is performed in a first mode of a set of modes, the set of modes including a second mode in which the eye-tracking camera captures an image of an eye.

16. The computer program product as in claim 15, wherein the capturing of the reflection in the first mode is performed in a dark environment.

17. An apparatus, comprising:
    memory; and
    processing circuitry coupled to the memory, the processing circuitry being configured to:
        capture, via an eye-tracking camera on a head-mounted display (HMD), a reflection of a pixel from a first lens of the HMD, the pixel being illuminated within a display associated with a second lens of the HMD;
        determine a current position of the reflection within a field of view of the eye-tracking camera; and
        determine a difference between the current position of the reflection within the field of view and a calibration position within the field of view.

18. The apparatus as in claim 17, wherein the processing circuitry is further configured to:
    determine a position of the pixel relative to the eye-tracking camera based on the difference.

19. The apparatus as in claim 17, wherein the processing circuitry is further configured to:
    adjust the position of the pixel to calibrate the display based on the difference.

20. The apparatus as in claim 17, wherein the first lens of the HMD is a pancake lens.

21. The apparatus as in claim 17, wherein the reflection is further illuminated with infrared (IR) illumination from an IR diode, the IR diode being attached to the display of the HMD.

22. The apparatus as in claim 21, wherein the IR illumination further illuminates the reflection via a reflection from the first lens of the HMD.

23. The apparatus as in claim 17, wherein the capturing of the reflection is performed in a first mode of a set of modes, the set of modes including a second mode in which the eye-tracking camera captures an image of an eye.

24. The apparatus as in claim 23, wherein the capturing of the reflection in the first mode is performed in a dark environment.

* * * * *